(12) United States Patent
Chua

(10) Patent No.: US 12,164,665 B2
(45) Date of Patent: Dec. 10, 2024

(54) METHOD AND APPARATUS FOR ENCRYPTING SELECTED PORTION OF FILE

(71) Applicant: Khee Seng Chua, Melbourne (AU)

(72) Inventor: Khee Seng Chua, Melbourne (AU)

( * ) Notice: Subject to any disclaimer, the term of this patent is extended or adjusted under 35 U.S.C. 154(b) by 716 days.

(21) Appl. No.: 17/284,829

(22) PCT Filed: Oct. 8, 2019

(86) PCT No.: PCT/IB2019/058540
§ 371 (c)(1),
(2) Date: Apr. 13, 2021

(87) PCT Pub. No.: WO2020/079527
PCT Pub. Date: Apr. 23, 2020

(65) Prior Publication Data
US 2021/0390205 A1    Dec. 16, 2021

Related U.S. Application Data

(60) Provisional application No. 62/745,368, filed on Oct. 14, 2018.

(51) Int. Cl.
G06F 21/62 (2013.01)
G06F 21/31 (2013.01)
G06F 21/60 (2013.01)
G06F 21/84 (2013.01)

(52) U.S. Cl.
CPC .......... *G06F 21/6245* (2013.01); *G06F 21/31* (2013.01); *G06F 21/602* (2013.01); *G06F 21/84* (2013.01)

(58) Field of Classification Search
CPC .... G06F 21/6245; G06F 21/31; G06F 21/602; G06F 21/84
See application file for complete search history.

(56) References Cited

U.S. PATENT DOCUMENTS

| | | | |
|---|---|---|---|
| 6,683,957 B1* | 1/2004 | Shin | H04N 19/46 380/54 |
| 10,360,389 B2* | 7/2019 | Ali | H04L 63/105 |
| 2002/0194481 A1 | 12/2002 | Roelofsen et al. | |
| 2008/0270807 A1* | 10/2008 | Forlenza | G06F 21/6209 713/193 |
| 2009/0238361 A1 | 9/2009 | Anan et al. | |
| 2016/0171227 A1* | 6/2016 | Margolin | H04L 63/0471 713/165 |
| 2016/0255358 A1 | 9/2016 | Agush | |
| 2018/0278797 A1* | 9/2018 | Chen | G06F 21/6254 |
| 2020/0311274 A1* | 10/2020 | Cooke | G06F 8/65 |

* cited by examiner

*Primary Examiner* — Abiy Getachew
(74) *Attorney, Agent, or Firm* — Jacob M. Ward; Ward Law Office LLC

(57) ABSTRACT

Disclosed is a method and a device for processing a file. According to an embodiment, the method comprises selecting a portion of the file to be encrypted; encrypting the selected portion of the file as encrypted data; and amending the file by replacing the selected portion with predefined data and appending the encrypted data at an end of the file.

17 Claims, 7 Drawing Sheets

METHOD AND APPARATUS FOR ENCRYPTING SELECTED PORTION OF FILE

CROSS REFERENCE TO RELATED APPLICATION

This application is a United States National Stage Application of PCT/IB2019/058540, filed on Oct. 8, 2019, which in turn claims the benefit of U.S. provisional application No. 62/745,368, filed Oct. 14, 2018, where the entire disclosures of the above applications are incorporated herein by reference.

TECHNICAL FIELD

The application relates to file processing, in particular, to method and apparatus for encrypting a selected portion of a file.

BACKGROUND

As devices such as mobile phones and digital cameras become more prevalent in everyday lives, sensitive documents and images are usually stored on the phone or computer or other storage devices.

This poses a security risk should the data fall into the wrong hands as the sensitive documents can be used for blackmail, identity theft or a source of embarrassment.

Presently, there are many software which offers encryption of documents or images. However, all of these software encrypts the document or image in its entirety. This makes the document or image incomprehensible unless it has been decrypted.

As the encrypted document does not make any sense, keyword searches cannot be performed on it. Encrypted image cannot be viewed at all without first decrypting the image.

Thus, for example, if a user is scrolling through the Camera Roll on his phone, the encrypted image would not be viewable without first decrypting it. This makes it tedious for the user to find the image he wants as he first has to guess which image is the one he wants, decrypt it and view it. If the image is not the one he wants, he needs to make another guess, decrypt it and view it and so on.

SUMMARY OF INVENTION

The present disclosure proposes a method and an apparatus to solve at least one of the technical problems as mentioned above, in which only sensitive portions of the document or image is encrypted, thereby allowing the document or image to be coherent yet protecting the sensitive portions of it from prying eyes.

In one aspect of the present application, a method for processing a file comprises: selecting a portion of the file to be encrypted; encrypting the selected portion of the file as encrypted data; and amending the file by replacing the selected portion with predefined data and appending the encrypted data at an end of the file.

According to an embodiment, the portion of file may be automatically selected according to a predefined rule or manually selected by a user.

According to an embodiment, the method may further comprise checking if an end-of-file marker is included at the end of the file; wherein, in case of an end-of-file marker is included, the encrypted data is appended after the end-of-file marker; and wherein, in case of no end-of-file marker is included, an end-of-file marker is created and the encrypted data is appended after the created end-of-file marker.

According to an embodiment, if the encrypted data is decrypted successfully, the file is restored and displayed as it was before encryption.

According to an embodiment, if the encrypted data is not decrypted or not decrypted successfully, the file is displayed as including the predefined data replacing the selected portion.

According to an embodiment, the file is an image file or a document file.

According to an embodiment, a plurality of portions of the file are selected, and each of the plurality of portions is encrypted and replaced separately, so that each of plurality of portions is able to be decrypted separately.

According to an embodiment, the amended file is able to be selectively transmitted as a whole from a start of the amended file to an end of the amended file or from a start of the amended file to where the appended encrypted data starts.

According to another aspect, a device for processing a file comprises a processor; and a memory for storing computer-readable instructions, wherein, when the instructions are executed by the processor, the processor performs the method of the method for processing the image as mentioned above.

According to another aspect, a computer-readable storing medium storing computer-readable instructions is further provided, wherein, when the instructions are executed by a processor, the processor performs the method of the method for processing the image as mentioned above.

DETAILED DESCRIPTION OF EMBODIMENTS

Reference will now be made in detail to some specific embodiments of the application including the best modes contemplated by the inventors for carrying out the invention. Examples of these specific embodiments are illustrated in the accompanying drawings. While the application is described in conjunction with these specific embodiments, it will be understood that it is not intended to limit the application to the described embodiments. On the contrary, it is intended to cover alternatives, modifications, and equivalents as may be included within the spirit and scope of the application as defined by the appended claims. In the following description, numerous specific details are set forth in order to provide a thorough understanding of the present application. The present application may be practiced without some of these specific details. In other instances, wellknown process operations have not been described in detail in order not to unnecessarily obscure the present application.

According to an embodiment of the present application, a method for processing a file is provided, which comprises the steps of selecting a portion of the file to be obfuscated; encrypting the selected portion of the file as encrypted data; and amending the file by replacing the selected portion with predefined data and appending the encrypted data at an end of the file. The file may be an image file or a document file. Since the selected portion is replaced with the predefined data, the selected portion will not be displayed without decryption. Since the amended file is not encrypted entirely, the amended file could be displayed without decryption. Since the encrypted data is appended at the end of the file, the amended file can be restored as it was before encryption if the encrypted data is decrypted successfully.

Figure 1:
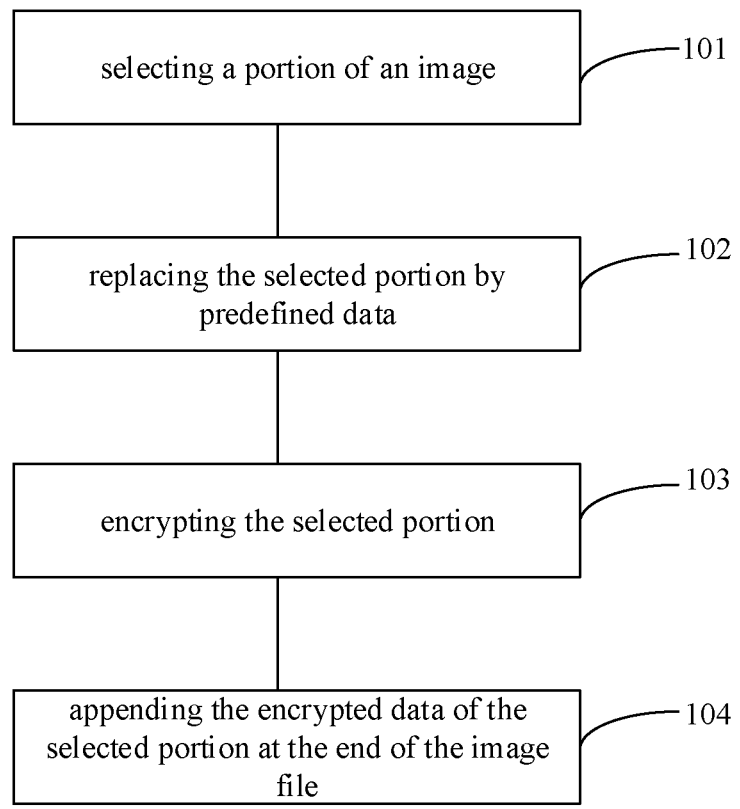
FIG. 1 illustrates a method for processing the file according to an embodiment of the present application.

FIG. 1 illustrates a method for processing the file according to an embodiment of the present application. In this embodiment, the file is an image as an example, which may be captured directly or loaded from a storage. It is understood that the file may also be a document. The process to the image is also applicable to the document.

At step 101, at least one portion of the image to be encrypted is selected. The selected portion may be an area that the user does not want other people to view. For example, the selected portion may include sensitive information. The portion may be selected by according to a predefined rule or manually selected by the user.

At step 102, the selected portion of the image is replaced by predefined data. The predefined data may be designated by the user. For example, the predefined data may be pixels in an image, a circle or a box filled with a certain color, an emoji or the like.

The selected portion is encrypted at step 103 and then appended at the end of the image at step 104. The selected portion may be encrypted by any suitable encryption algorithm. An encryption algorithm may be called for encrypting the selected portion. For example, the selected portion may be encrypted by a password, which may also be used for decrypting the encrypted data to recover the selected portion. If more than one encryption algorithms are available, the user may select one of them for encrypting the selected portion. The encrypted data may be appended at the end of the file. For example, the encrypted data may be appended after the end-of-file marker of the file.

Accordingly, the final resultant file includes the unselected portions of the image as original, the predefined data for replacing the selected portion, and the encrypted data of the selected portion at the end of the file. The final resultant file may be stored as a whole in a storage.

Figure 2:
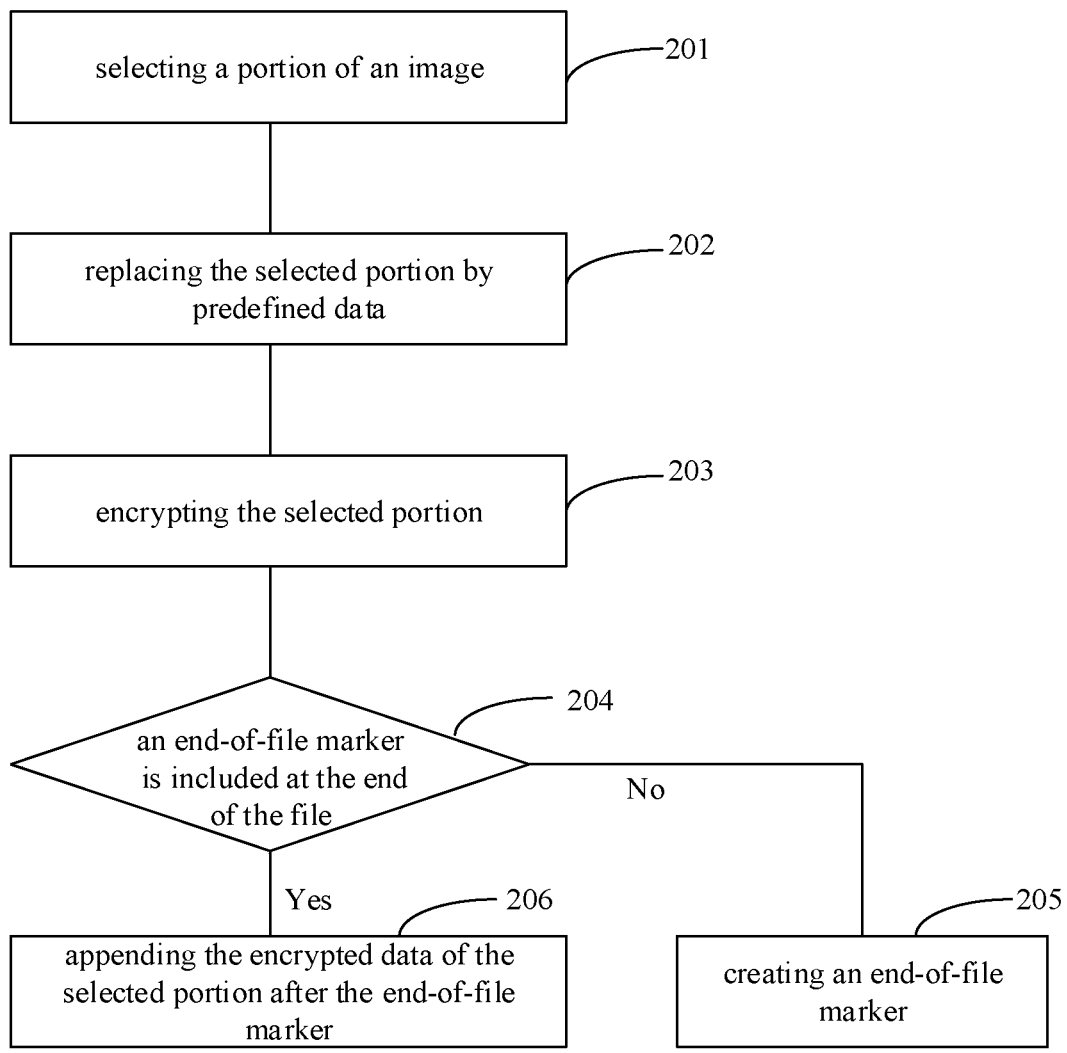
FIG. 2 illustrates a method for processing the file according to another embodiment of the present application.

It is understood that the steps 102, 103 and 104 may be implemented in any suitable sequence and also may be implemented in parallel as desired, but are not limited to the sequence shown in FIG. 2.

FIG. 2 illustrates a method for processing the file according to another embodiment of the present application.

At step 201, at least one portion of the image to be encrypted is selected. The selected portion may be an area that the user does not want other people to view. For example, the selected portion may include sensitive information. The portion may be selected by according to a predefined rule or manually selected by the user.

At step 202, the selected portion of the image is replaced by predefined data. The predefined data may be designated by the user. For example, the predefined data may be pixels in an image, a circle or a box filled with a certain color, an emoji or the like.

At step 203, the selected portion is encrypted.

At step 204, it is checked whether an end-of-file marker is included at the end of the file. If it is determined in step 204 that an end-of-file marker is included at the end of the file, the encrypted data is appended after the end-of-file marker of the file at step 206. If it is determined in step 204 that an end-of-file marker is not included at the end of the file, an end-of-file marker is created at step 205 and the encrypted data is appended after the end-of-file marker of the file at step 206.

Accordingly, the final resultant file includes the unselected portions of the image as original, the predefined data for replacing the selected portion, and the encrypted data of the selected portion at the end of the file. The final resultant file may be stored as a whole in a storage.

It is understood that the steps 202, 203 and 204 may be implemented in any suitable sequence or be implemented in parallel as desired, but are not limited to the sequence shown in FIG. 2.

According to an embodiment, when the amended file obtained according to the method as described above is to be transmitted to other users, the file may be selectively transmitted from the start of the amended file to the end of the amended file or from the start of the amended file to where the appended encrypted data starts.

Figure 3A:
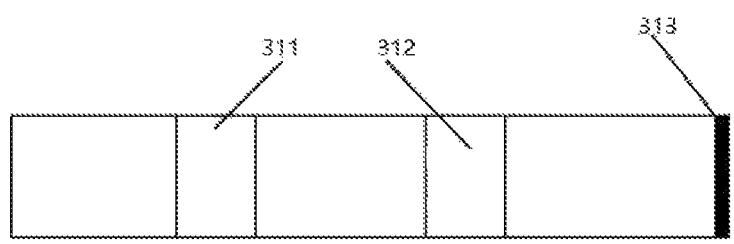
FIGS. 3a to 3f illustrate examples of the structure of a file before and after being processed according to an embodiment of the present application.
Figure 3B:
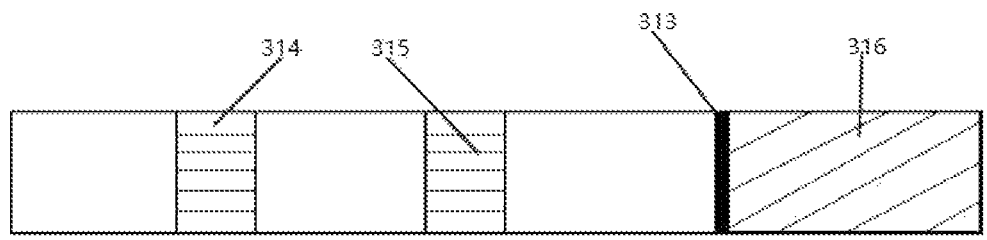

FIG. 3a illustrate an example of the structure of an original file in Jpeg format and FIG. 3b illustrates the file of FIG. 3a with selected portions replaced and encrypted data appended. The file in Jpeg format has an end-of-file marker 313 as shown. For example, if portions 311 and 312 are selected as portions needed to be encrypted and hidden, the portions 311 and 312 may be replaced by data 314 and 315, and encrypted as encrypted data 316 which is then appended after the end-of-file marker 313. When the file of FIG. 3b is read, the content before the end-of-file marker 313 is identified and extracted for displaying as an image. Content associated with the encrypted data 316, i.e., the selected portions 311 and 312, will not be displayed. Instead, the predefined data 314 and 315 are displayed for replacing the selected portions 311 and 312.

Although the encrypted data of portions 311 and 312 are stored as a single portion 316 as shown in FIG. 3b, the portions 311 and 312 may be encrypted separately and the encrypted data of portions 311 and 312 may be stored after the end-of-file marker 313 separately as two portions.

The selected portions 311 and 312 may be encrypted with the same key. Alternatively, the selected portions 311 and 312 may be encrypted with different keys. When the selected portions 311 and 312 are encrypted with different keys, the encrypted data of the portions 311 and 312 must be decrypted separately with different keys. When a first encrypted portion among the encrypted portions is decrypted successfully, the image is displayed as including the original image portion corresponding to the first encrypted portion and the predefined data for replacing the remaining encrypted portions. For example, when the encrypted data of the portion 311 is decrypted successfully but the encrypted data of the portion 312 is not decrypted successfully, the image is displayed as including the selected portion 311 and the predefined data 315 for replacing the portion 312. Accordingly, when different keys are assigned for the encrypted data of different portions, the different keys can be told to different people and thus the different people may have different rights to view some of the encrypted portions. For example, user A may view the image including the decrypted portion A such as the portion 311 and user B may view the image including the decrypted portion B such as the portion 312.

Figure 3C:
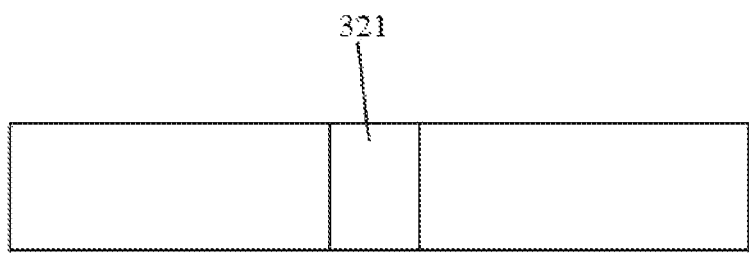
Figure 3D:
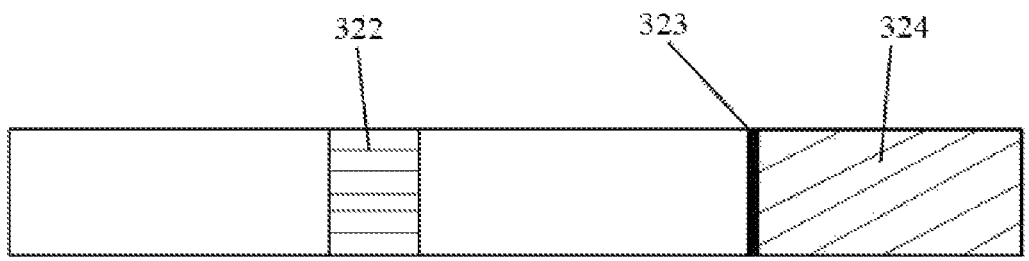

FIG. 3c illustrate an example of the structure of an original file without the end-of-file marker and FIG. 3d illustrates the file of FIG. 3c with selected portions replaced and encrypted data appended. The file as shown in FIG. 3c does not have an end-of-file marker. The portion 321 is selected as a portion needed to be encrypted and hidden. As shown in FIG. 3d, the portion 321 is replaced by predefined data 322 and encrypted as encrypted data 324. An end-of-file marker 323 is created and added at the end of the file, and the encrypted data 324 is appended after the end-of-file marker 323. When the file of FIG. 3d is read, the content before the end-of-file marker 323 is identified and extracted for displaying as an image. Content associated with the encrypted data 324 i.e., the selected portion 321, will not be displayed. Instead, the predefined data 322 is displayed for replacing the selected portion 321.

Figure 3E:
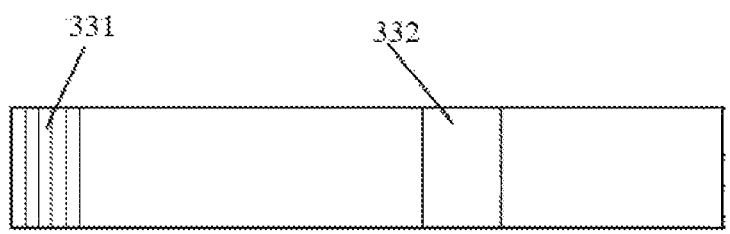
Figure 3F:
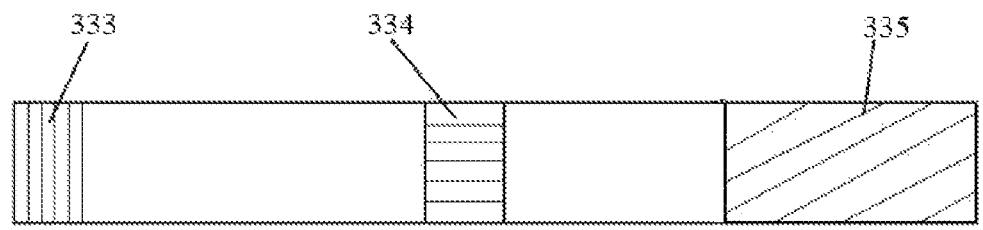

FIG. 3e illustrate an example of the structure of an original file without the end-of-file marker but have a header indicating the size of the file and FIG. 3f illustrates the file of FIG. 3e with selected portions replaced and encrypted data appended. The file as shown in FIG. 3e does not have an end-of-file marker, but has a hear including a field indicating the size of the file. For example, the image file nay be in the bitmap format. The portion 332 is selected as a portion needed to be encrypted and hidden. As shown in FIG. 3f, the portion 332 is replaced by predefined data 334 and encrypted as encrypted data 335. The header 333 has a field indicating the size of the file in which the portion 332 is replaced by the predefined data 334 without the encrypted data 335. Thus the end of the file, in which the portion 332 is replaced by the predefined data 334 and the encrypted data 335 is not included, is indicated by the header 333 and the encrypted data 335 is appended at the end of the file indicated by the header 333. When the file of FIG. 3f is read, the content before the end of file marker indicated by the header 333 is identified and extracted for displaying as an image. Content associated with the encrypted data 335, i.e., the selected portion 332, will not be displayed. Instead, the predefined data 334 is displayed for replacing the selected portion 321.

Figure 4:
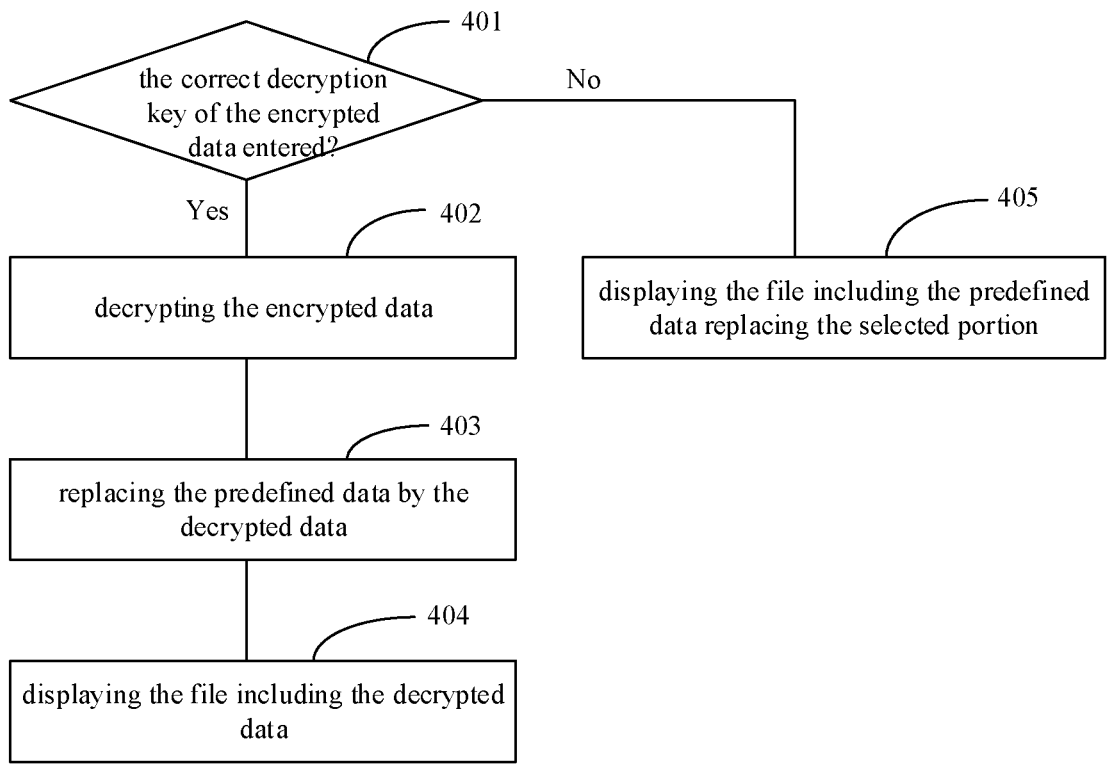
FIG. 4 illustrates a method for displaying the final resultant file generated according to an embodiment of the present application.

FIG. 4 illustrates a method for displaying the final resultant file generated according to an embodiment of the present application. As mentioned above, the file includes the unselected portions of the image as original, the predefined data for replacing the selected portion, and the encrypted data of the selected portion at the end of the file.

At step 401, it is determined whether the user entered the correct decryption key of the encrypted data. If it is determined at step 401 that the corrected decryption key is entered, the encrypted data of the selected portion is decrypted at step 402. At step 403, the decrypted data of the selected portion is used for replacing the predefined data which has replaced the selected portion in a previous stage. At step 404, the image including the decrypted data such as the original file is displayed. If it is determined at step 401 that the corrected decryption key is not entered, the image is displayed at step 405 as including the unselected portions of the image as original and the predefined data for replacing the selected portion.

It is understood that the file to be processed according to the present application may also be a document. The selected portion of the document to be hidden may be certain word(s), phrase(s), sentence(s), paragraph(s), table(s), numerical value(s) or the like. The selected portion may be encrypted and replaced by predefined data, such as certain symbol(s), character(s), emoji(s), a picture in a certain shape and/or color, or the like. The selected portion may be appended at the end of the file as encrypted data. The processes described with reference to the image file are also applicable to the document file, and thus detailed description thereof is omitted.

The method according to the present application can be implemented by software, firmware, hardware and/or any suitable combination thereof.

Figure 5:
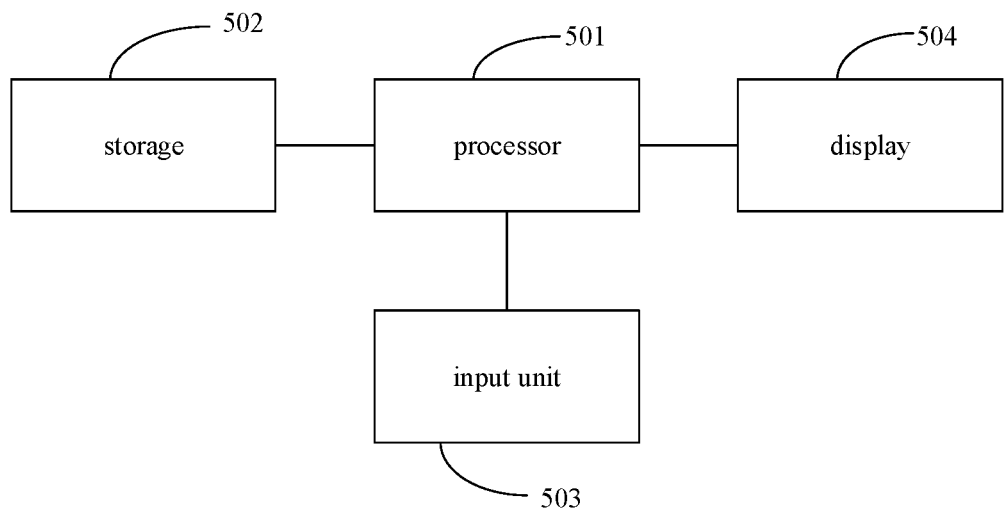
FIG. 5 is a block diagram illustrating a device for implementing the method according to an embodiment of the present application.

FIG. 5 is a block diagram illustrating a device for implementing the method according to an embodiment of the present application. As shown, the device includes a process 501, a storage 502, an input unit 503 and a display 504. The file to be processed and/or the file after being processed may be stored in the storage 502. The storage 502 may include one or more volatile storage (or memory) devices such as random access memory (RAM), dynamic RAM (DRAM), synchronous DRAM (SDRAM), static RAM (SRAM), or other types of storage devices. The storage 502 may store information including sequences of instructions that are executed by the processor 501 or any other device.

The processor 501 may retrieve a file such as an image or a document from the storage 502, and perform the method according to the present application as described above. For example, the processor 501 may perform the steps 101-104 and/or steps 201-206 as illustrated in FIGS. 1-2. The step of selecting a portion of an image may be performed in response to user's input received from the input unit 503. The final obtained file may be stored into the storage 502 or displayed in the display 504.

Although some embodiments of the present application have been described, those skilled in the art can make variations or modifications to these embodiments upon knowing the basic inventive concept. Although details of the embodiments are described, it is understood that it is not necessary to include all elements in the described embodiments. Instead, some elements in the embodiments could be omitted or altered, without departing from the invention. The appended claims are intended to be considered as comprising the described embodiments and all the variations or modifications fell into the scope of the present application.

The invention claimed is:

1. A method for selectively encrypting a portion of a file, comprising
    selecting portions of the file to be encrypted;
    encrypting the selected portions of the file as encrypted data; and
    amending the file by replacing the selected portions with predefined data and appending the encrypted data as a single portion at an end of the file, wherein the encrypted data is hidden when the file is displayed;
    checking if an end-of-file marker is included at the end of the file;
    wherein, if the end-of-file marker is included, the encrypted data is appended after the end-of-file marker; and
    wherein, if the end-of-file marker is not included, the end-of-file marker is created and the encrypted data is appended after the created end-of-file marker.

2. The method of claim 1, wherein the portions of file are automatically selected according to a predefined rule or manually selected by a user.

3. The method of claim 1, wherein if the encrypted data is decrypted successfully, the file is restored and displayed as it was before encryption.

4. The method of claim 1, wherein if the encrypted data is not decrypted or not decrypted successfully, the file is displayed as including the predefined data replacing the selected portion.

5. The method of claim 1, wherein the file is an image file or a document file.

6. The method of claim 1, wherein a plurality of portions of the file are selected, and each of the portions is encrypted and replaced separately, so that each of the portions is configured to be decrypted separately.

7. The method of claim 1, wherein the amended file is configured to be selectively transmitted as a whole from a start of the amended file to an end of the amended file or from a start of the amended file to where the encrypted data appended at the end of the file.

8. A device for selectively encrypting a portion of a file, comprising
a processor; and
a memory for storing computer-readable instructions,
wherein, when the instructions are executed by the processor, the processor is configured for
selecting portions of the file to be encrypted,
encrypting the selected portions of the file as encrypted data, and
amending the file by replacing the selected portions with predefined data and appending the encrypted data as a single portion at an end of the file, wherein the encrypted data is hidden when the file is displayed;
checking if an end-of-file marker is included at the end of the file;
wherein, if the end-of-file marker is included, the encrypted data is appended after the end-of-file marker; and
wherein, if the end-of-file marker is not included, the end-of-file marker is created and the encrypted data is appended after the created end-of-file marker.

9. The device of claim 8, wherein the portions of file are automatically selected according to a predefined rule or manually selected by a user.

10. The device of claim 8, wherein a plurality of portions of the file are selected, and each of the portions is encrypted and replaced separately, so that each of the portions is configured to be decrypted separately.

11. The device of claim 8, wherein the amended file is configured to be selectively transmitted as a whole from a start of the amended file to an end of the amended file or from a start of the amended file to where the encrypted data appended at the end of the file.

12. The device of claim 8, wherein if the encrypted data is not decrypted or not decrypted successfully, the file is displayed as including the predefined data replacing the selected portion.

13. A computer-readable storing medium storing computer-readable instructions configured for selectively encrypting a portion of a file, wherein, when the instructions are executed by a processor, the processor is configured for
selecting portions of the file to be encrypted,
encrypting the selected portions of the file as encrypted data, and
amending the file by replacing the selected portions with predefined data and appending the encrypted data as a single portion at an end of the file, wherein the encrypted data is hidden when the file is displayed;
checking if an end-of-file marker is included at the end of the file;
wherein, if the end-of-file marker is included, the encrypted data is appended after the end-of-file marker; and
wherein, if the end-of-file marker is not included, the end-of-file marker is created and the encrypted data is appended after the created end-of-file marker.

14. The computer-readable storing medium of claim 13, wherein a plurality of portions of the file are selected, and each of the portions is encrypted and replaced separately, so that each of the portions is configured to be decrypted separately.

15. The computer-readable storing medium of claim 13, wherein the amended file is configured to be selectively transmitted as a whole from a start of the amended file to an end of the amended file or from a start of the amended file to where the encrypted data appended at the end of the file.

16. The computer-readable storing medium of claim 13, wherein if the encrypted data is not decrypted or not decrypted successfully, the file is displayed as including the predefined data replacing the selected portion.

17. The method of claim 1, further comprising indicating by a header, the encrypted data at the end of the file.

* * * * *